US012085966B2

(12) United States Patent
Tunks et al.

(10) Patent No.: US 12,085,966 B2
(45) Date of Patent: Sep. 10, 2024

(54) PREDICTIVE OPEN LOOP PRE-HEATING OF ELECTRONIC DEVICES IN COLD ENVIRONMENTS

(71) Applicant: Dell Products L.P., Round Rock, TX (US)

(72) Inventors: Eric Michael Tunks, Austin, TX (US); Ayedin Nikazm, Austin, TX (US); John Randolph Stuewe, Round Rock, TX (US); Joseph Andrew Vivio, Seattle, WA (US)

(73) Assignee: Dell Products, L.P., Round Rock, TX (US)

( * ) Notice: Subject to any disclaimer, the term of this patent is extended or adjusted under 35 U.S.C. 154(b) by 221 days.

(21) Appl. No.: 17/577,632

(22) Filed: Jan. 18, 2022

(65) Prior Publication Data

US 2023/0229181 A1    Jul. 20, 2023

(51) Int. Cl.
*G05D 23/20*    (2006.01)
*G05B 15/02*    (2006.01)
*G06F 1/28*    (2006.01)

(52) U.S. Cl.
CPC .............. *G05D 23/20* (2013.01); *G05B 15/02* (2013.01); *G06F 1/28* (2013.01)

(58) Field of Classification Search
CPC ...... G06F 1/3287; G06F 1/206; G06F 1/3215; G06F 1/20; G06F 1/181; G06F 1/28; G05D 23/2033; G05D 23/22; G05D 23/24; G05D 23/2401; G05D 23/30; G05D 23/303; G05D 23/32

See application file for complete search history.

(56) References Cited

U.S. PATENT DOCUMENTS

| | | | | |
|---|---|---|---|---|
| 10,506,743 B2 * | 12/2019 | Lovicott | ............ | H05K 7/20727 |
| 2007/0219644 A1 * | 9/2007 | Sonobe | ................ | G06F 1/3203 700/12 |
| 2009/0204839 A1 * | 8/2009 | Gross | ...................... | G06F 1/206 713/340 |
| 2011/0296155 A1 * | 12/2011 | Belady | ...................... | G06F 9/44 713/300 |
| 2015/0057830 A1 * | 2/2015 | Slaby | ...................... | G06F 1/324 700/300 |

* cited by examiner

*Primary Examiner* — Raymond N Phan
(74) *Attorney, Agent, or Firm* — Chamberlain, Hrdlicka, White, Williams & Aughtry; Aly Z. Dossa (57) ABSTRACT

Embodiments of the invention may provide an improved method for pre-heating an electronic device such as an information handling system, when internal temperatures are below safe operating ranges. To do so, the system selectively heats the entire device or select zones of the electronic device for a predetermined amount of time when the system is restarted after a period of time sufficient to bring the system to ambient temperatures. The predetermined amount of time is determined based on measured ambient temperatures. Using a table that corresponds the ambient temperatures to a time that a component needs to heat up to a nominal temperature in a zone, the predetermined time can be calculated.

17 Claims, 9 Drawing Sheets

PREDICTIVE OPEN LOOP PRE-HEATING OF ELECTRONIC DEVICES IN COLD ENVIRONMENTS

BACKGROUND

As networking and communication technologies advance, there is an increased need for providing datacenters closer to the end users or on the "Edge". These datacenters are typically smaller than that of large "Cloud" based datacenters, but still have requirements that are similar to those of large Cloud based datacenters.

The information handling system mounted in the datacenters are generally designed for a 10° C. to 35° C. environment. However, Edge or Telco datacenters often have minimal to no heating or cooling capabilities. This can result in information handling systems needing to operate below or above the range which they are designed for, and can be harmful to components such as processors in the information handling system. Potentially, if the information handling system is operated outside of the range it is designed for, device failures can occur and/or permanent physical damage to components of the information handling system.

SUMMARY

Embodiments of the present invention provide a method and system for heating and cooling an electronic device. The method and system includes using lookup tables to determine a predetermined time to heat the electronic device or individual zones in the electronic device. The predetermined time can be a time that it takes to heat a coldest component from a specific ambient temperature to an operational or nominal temperature.

In accordance with the first aspect, the present invention provides a method for preheating an electronic device. The method comprises of measuring an ambient temperature of air outside of the electronic device. The method uses a lookup table to determine a predetermined time to heat the electronic device based on at least the ambient temperature of air outside of the electronic device. The method then heats the electronic device for the predetermined time and powers on the electronic device when the predetermined time is completed.

In accordance with the second aspect, the present invention provides an electronic device that includes at least one sensor for determining an ambient temperature of air outside of the electronic device. The electronic device further includes a processor that controls the electronic device and a memory having computer program instructions stored thereon. The processor executes the computer program instructions in the memory to perform a method, the method includes having the at least one sensor measure an ambient temperature of air outside of the electronic device. The processor then uses a lookup table to determine a predetermined time to heat the electronic device based on at least the ambient temperature of air outside of the electronic device. Once the predetermined time is determined, the processor then causes a heating means to heat the electronic device for the predetermined time. The processor then powers on the electronic device when the predetermined time is completed.

In accordance with the third aspect, it provides a non-transitory computer readable medium comprising computer readable program code, which when executed by a computer processor enables the computer processor to perform a method. The method includes measuring an ambient temperature of air outside of the electronic device. Based on the measuring it then uses a lookup table to determine a predetermined time to heat the electronic device based on at least the ambient temperature of air outside of the electronic device. Once the predetermined time is determined, the electronic device is heated for the predetermined time, and then the method powers on the electronic device when the predetermined time is completed.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a front view of a diagram of an information handling system in accordance with one or more embodiments of the invention.

FIG. 1.2 shows a side view of a diagram of an information handling system in accordance with one or more embodiments of the invention.

FIG. 4.1 shows a diagram of a circuit card with computing components with separate zones in accordance with one or more embodiments of the invention.

FIG. 4.2 shows a diagram of a circuit card with computing components with one zone having a heating element and another zone having a cooling system in accordance with one or more embodiment of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regards to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regards to a corresponding like-named component in any other figure.

In general, embodiments of the invention relate to systems, devices, and methods for managing components of an electronic device. In at least one embodiment the electronic device is an information handling system that may provide computer implemented services. These services may include, for example, database services, electronic communication services, data storage services, etc.

To provide these services, the information handling system may include one or more computing devices. The computing devices may include any number of computing components that facilitate providing of the services of the information handling system. The computing components may include, for example, processors, memory modules, circuit cards that interconnect these components, etc.

During operation, these components may be exposed to external environmental/ambient air or gasses which may be at various temperatures including outside of a nominal (operational) temperature ranges specific to the components. When the temperature is outside of the nominal temperature ranges, without making adjustments or providing heating or cooling as appropriate, components of the information handling system can be damaged. Over time operating the components outside of the nominal temperature ranges may cause the components to fail prior to the computing devices meeting their expected service life.

Embodiments of the invention may provide methods and systems to actively monitor ambient temperature of air outside of and associated with an electronic device. Based on those ambient temperatures, the system can preheat the electronic device appropriately to avoid damaging components of the electronic device. The system utilizes a lookup table which provides a correspondence with an ambient temperature to the amount of time a component or zone needs to be heated before it can safely be operated.

By using a lookup table, the system and method can, in at least some embodiments, determine how long to provide heating to components, without the need of internal temperature sensors. By doing so, system failure can be avoided and the components forming the electronic device may be less likely to prematurely fail when the device is operated in less than ideal environmental conditions, without having to retro fit or provide expensive temperature sensors.

Figure 11:
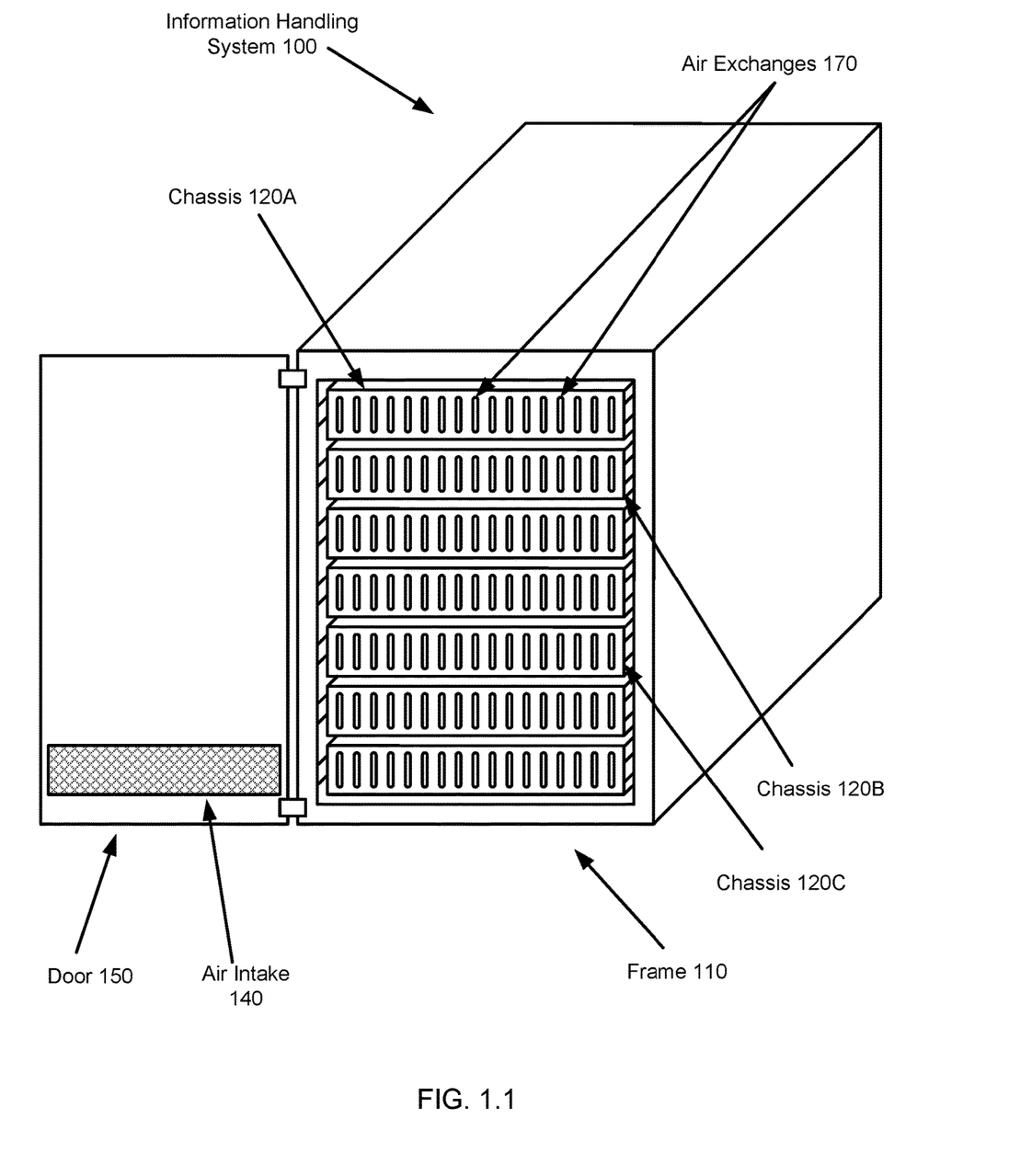
Figure 12:
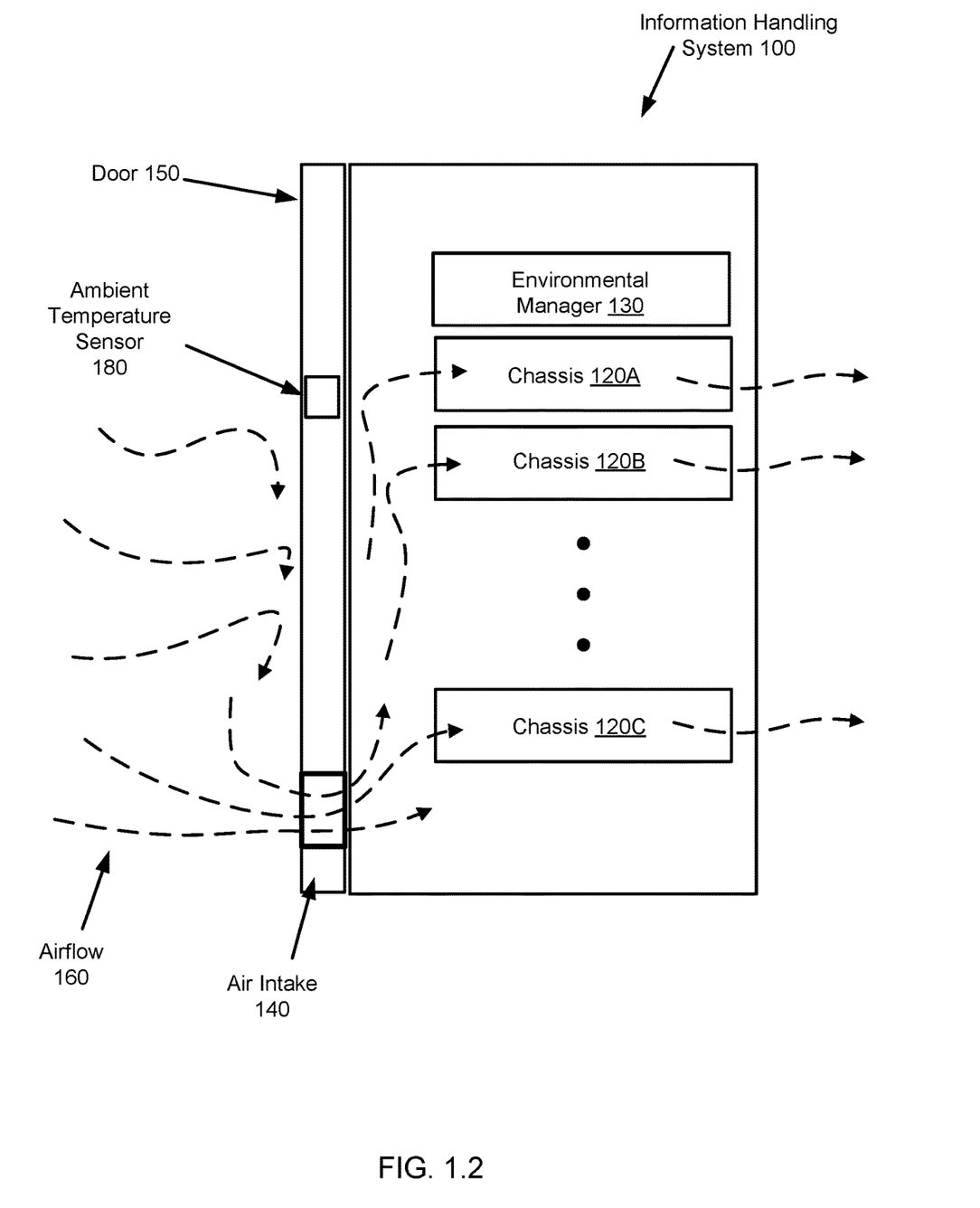

FIG. 1.1 shows the front of an information handling system (100) in accordance with one or more embodiments of the invention and FIG. 1.2 shows a side view of an information handling system (100) in accordance with one or more embodiments of the invention. The system may include a frame (110) and any number of chassis (e.g., 120A, 120B, 120C).

The frame (110) may be a mechanical structure that enables multiple chassis (120A-120C) to be positioned with respect to one another. The mechanical structure of the frame (110) can include a door (150) that includes an air intake (140) for providing external ambient air to the chassis (120A) mounted within the frame (110).

The information handling system (100) can take many forms. For example, the frame (110) may be a rack mount enclosure that enables the chassis (120A) to be disposed within it.

The frame (110) may be implemented as other types of structures adapted to house, position, orient, and/or otherwise physically, mechanically, electrically, and/or thermally manage the chassis (120A-120C). By managing the chassis (120A), the frame (110) may enable multiple chassis (120A-120C) to be densely packed in space without negatively impacting the operation of the information handling system (100).

A chassis (e.g., 120A) may be a mechanical structure for housing components of an information handling system. For example, a chassis (120A) may be implemented as a rack mountable enclosure for housing components of an information handling system. The chassis may be adapted to be disposed within the frame (110) and/or utilize services provided by the frame (110) and/or other devices. Any number of components may be disposed in each of the respective chassis (e.g., 120A, 120B, 120C).

The system can also include an external power source (not shown). The external power source can take any form and in one embodiment, is electrical power provided by an electrical utility. In other embodiments it may take the form of on-site power generators, including backup fossil-fuel burning generators, solar panels, wind energy, and other sources of power for operating computing components. The generating components of the external power source can be located near to the information handling system (100) or deliver power to the information handling system (100) over transmission means from off-site locations.

The system may further include an ambient temperature sensor (180) which can be mounted within the frame such as in the door (150). It can alternatively, or in addition, be mounted outside of the information handling system (100) such as, but not limited to, in the airflow (160), in the various chassis (120A-120C), in the air intake (140), or other interior components such as an environmental manager (130).

Alternatively, according to some embodiments, the system may not include an ambient temperature sensor. The system in these embodiments can obtain ambient temperatures from external sources networked with the information handling system (100). These can be from temperature sensors associated with an enclosure (not shown) housing one or more information handling systems (100). Alternatively, they can be provided by an information service that provides weather data and/or forecasts associated with the location where the information handling system (100) is disposed.

To maintain the temperatures of the components in the chassis, within a nominal range, an environmental manager (130) causes fans and other similar device to take in external airflow (160) through an air intake (140). The gases forming the external air may be passed to the chassis (120A) to cool or heat the components therein. The heated gases may then be expelled out of another opening (not shown) in the housing of the information handling system (100).

When the components of an information handling system provide computer implemented services, the components may generate heat. For example, the components may utilize electrical energy to perform computations and generate heat as a byproduct of performing the computations. If left unchecked, buildup of heat within a chassis may cause temperatures of the components disposed within the chassis to exceed preferred ranges.

The preferred ranges may include a nominal range in which the components respectively operate (i) without detriment and/or (ii) are likely to be able to continue to operate through a predetermined service life of a component. Consequently, it may be desirable to maintain the temperatures of the respective components within the preferred range (e.g., a nominal range).

When a component operates outside of the preferred (nominal) range, the service life of the component may be reduced. The component may not be able to perform optimally (e.g., reduced ability to provide computations, higher likelihood of error introduced into computations, etc.), and/or the component may be more likely to unexpectedly fail. The component may be subject to other undesirable behavior when operating outside of the preferred range without departing from the invention.

To operate components within the preferred range of temperature, an environmental manager (130) along with other components such as the air intake (140) and air exchanges in the chassis (e.g. 170) may work to exchange gases such as air with an ambient environment. For example, a chassis (120A) may utilize air exchanges (170) to (i) vent hot air and (ii) intake cool air that is drawn in through the air intake (140). By doing so, the temperature of the air within the chassis may be reduced. Consequently, the temperatures of components within the chassis may be reduced by utilizing the cooler gases taken into the chassis via an air exchange.

In another example, the ambient gases and/or the internal environment of the information handling system (100) may be too cold. This can be detrimental to many of the components. For example below a certain temperature normal transistor operation of processors can be negatively affected. The environmental manager (130) or other similar devices can activate hating elements to heat the internal environment or individual components. In other embodiments the environmental manager (130) or other similar device can control fans and the air intakes (140) and (170) to reduce cooling and/or use waste heat to heat other components of the information handling system (100).

To address the above and/or other potential issues, electronic devices such as an information handling system (100) rely on heating and cooling systems to maintain the proper temperature. Yet in many telecom and edge applications (as non-limiting examples), heating and cooling systems are either not present, or are not sufficient for extreme weather. Also when external power is loss, it is possible that the heating and cooling systems (when present) will no-longer function, leading to any device powered by a back-up power system (not shown) to be subject to ambient temperatures.

Figure 2:
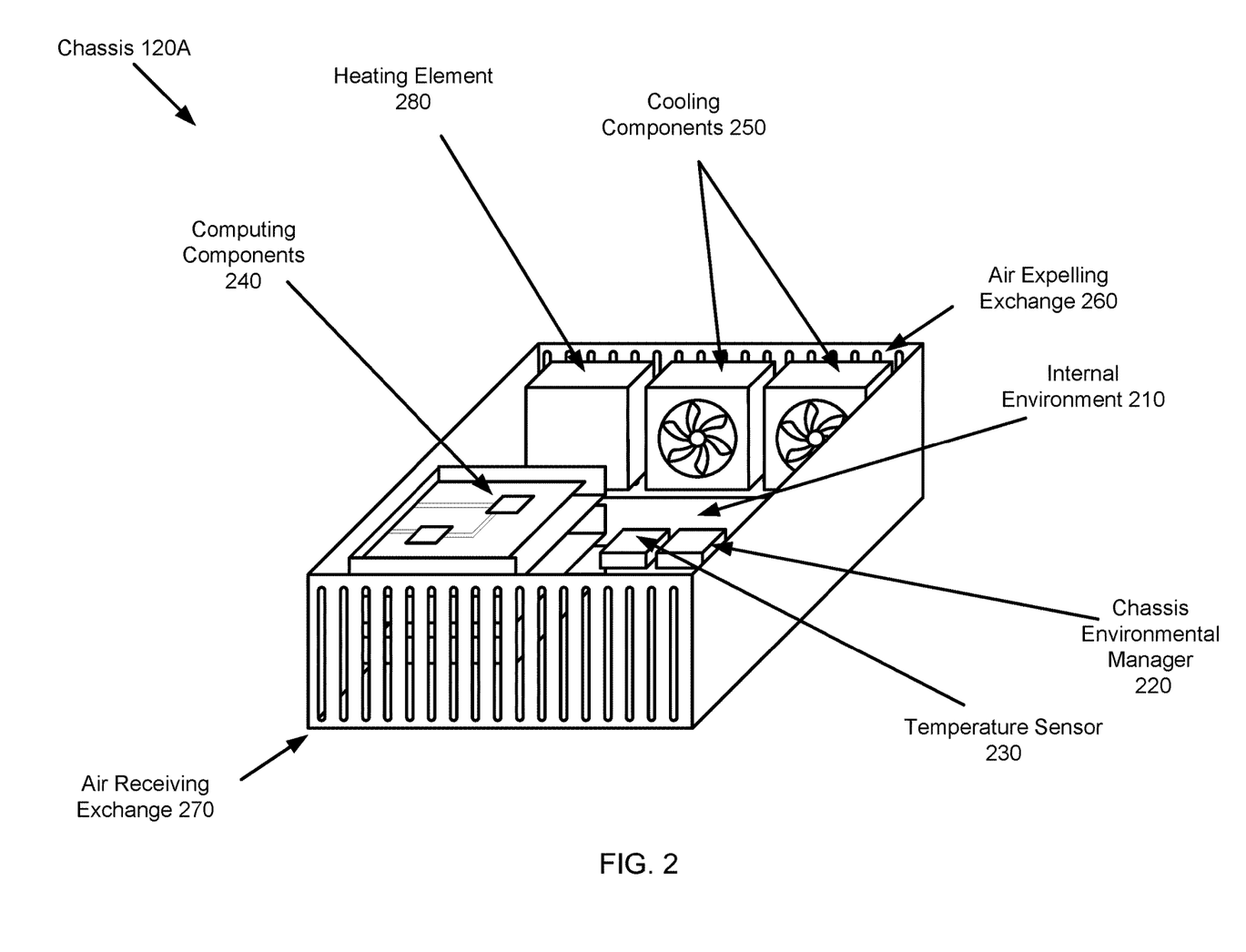
FIG. 2 shows a diagram of a chassis of an information handling systems in accordance with one or more embodiments of the invention.

To further clarify the processes of managing the internal temperature within an electronic device such as a chassis, a diagram of an exemplary chassis is illustrated in FIG. 2.

FIG. 2 shows a diagram of a chassis (120A) in accordance with one or more embodiments of the invention. A chassis (120A) may be a portion of an information handling system (100) and/or house all, or a portion, of an information handling system (see FIG. 1). An information handling system may include a computing device that provides any number of services (e.g., computing implemented services). To provide services, the computing device may utilize computing resources provided by the computing components (240). The computing components (240) may include, for example, processors, memory modules, storage devices, special purpose hardware, and/or other types of physical components that contribute to the operation of the computing device. For additional details regarding computing devices, refer to FIG. 7.

While the chassis (120A) of FIG. 2 has been illustrated as including a limited number of specific components, a chassis in accordance with one or more embodiments of the invention may include additional, fewer, and/or different components without departing from the invention. Additionally, while the chassis (120A) is illustrated as having a specific form factor (e.g., rack mount), a chassis in accordance with embodiments of the invention may have different form factors without departing from the invention, including as a device that can operate by itself with or without a frame (110).

As discussed above, the chassis (120A) may house computing components (240). The computing components (240) may enable computing devices to provide services, as discussed above. The computing components (240) may include, for example, packaged integrated circuits (e.g., chips). The computing components (240) may enable any number and type of functionalities to be performed by a computing device.

In one or more embodiments disclosed herein, the computing components (240) include storage that is implemented using devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, the computing components (240) may include a memory device (e.g., a dual in line memory device) in which data is stored and from which copies of previously stored data are provided. In another example, the computing components (240) may include a persistent storage device (e.g., a solid state disk drive) in which data is stored and from which copies of previously stored data are provided. In yet another example, computing components (240) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Computing components may consume electrical power and generate heat as a byproduct of performing their functionality. Further, the computing components (240) may have some sensitivity to temperature. For example, the computing components (240) may only operate nominally (e.g., as designed) when the temperatures of the respective components (240) are maintained within a preferred temperature range. Consequently, all, or a portion, of the computing components (240) may require some level of cooling and/or heating to continue to operate nominally.

Because the computing device uses computing components (240) to provide services, the ability of the computing device to provide services is limited based on the number and/or quantity of computing devices that may be disposed within the chassis. For example, by adding additional processors, memory modules, and/or special purpose hardware devices, the computing device may be provided with additional computing resources which it may be used to provide services. Consequently, large number of computing components that each, respectively, generate heat may be disposed within the chassis.

To maintain the temperatures of the computing components (240) (and/or other types of components) within a nominal range, external air such as ambient air may be taken in through an air receiving exchange (270). The gases forming the external air may be passed by the computing components (240) to exchange heat with them. The heated gases may then be expelled out of another air exchange such as an air expelling exchange (260).

The gases forming the external air are moved by cooling components (250). The cooling components (250) may include gas movers such as fans. The fans may be able to modify the rate of gases being taken into and expelled from the chassis (120A) through the air exchangers (e.g., 260, 270). The cooling components (250) may also include baffles or dampeners, which will be described in more detail with regards to FIG. 3. The rate of intake and exhaust of gases may cause an airflow to be generated within the internal environment (210). The airflow may be used to modify the rate of thermal exchange between the computing components (240) and the internal environment (210) (e.g., an environment proximate to the computing components (240)).

The gases and/or the computing components (240) can additionally be heated by the use of a heating element (280). While heating element (280) is shown as a stand-alone device mounted with other environmental cooling components (250), it can take many forms and can also comprise of multiple heating devices.

Figure 41:
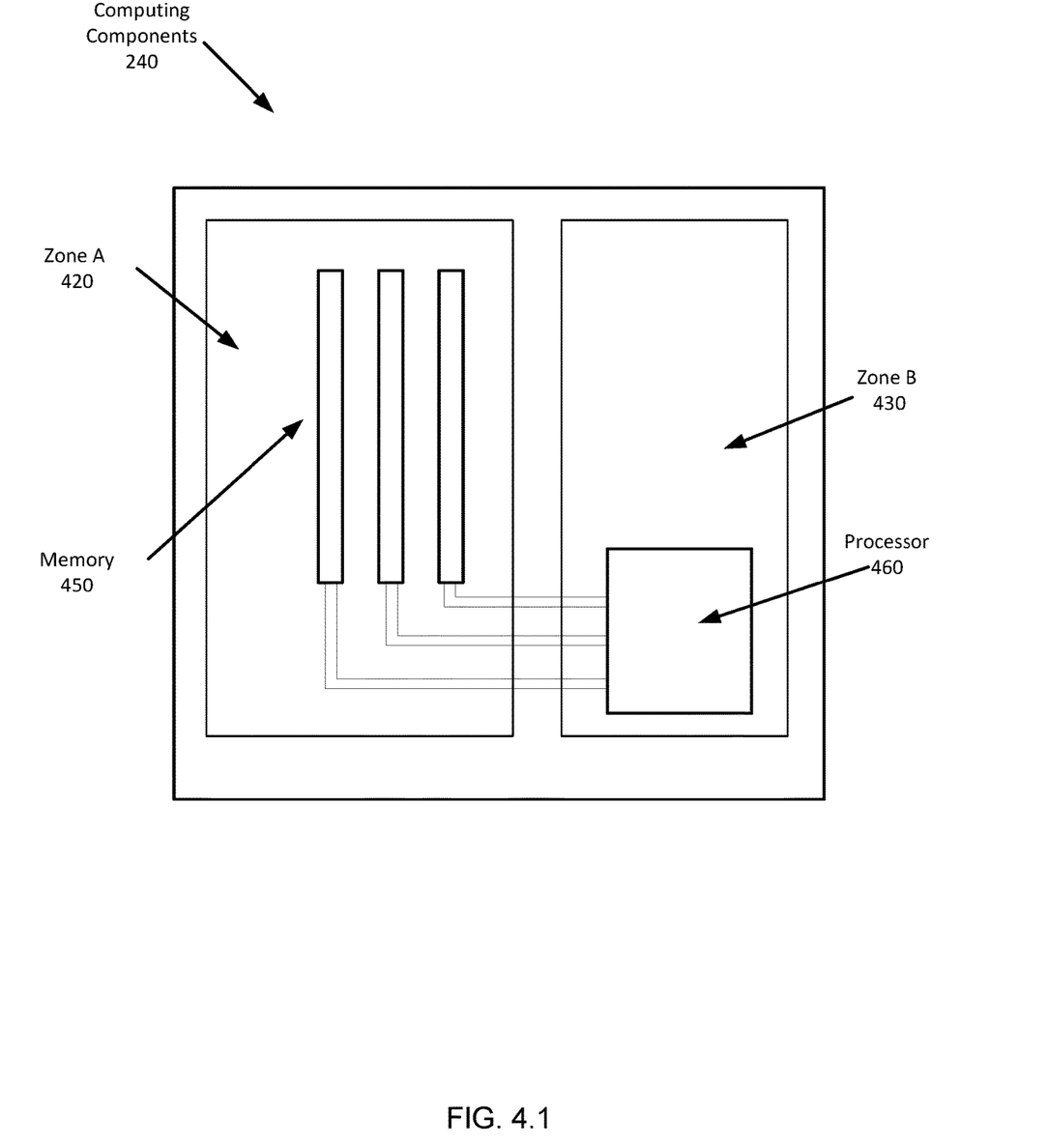
Figure 42:
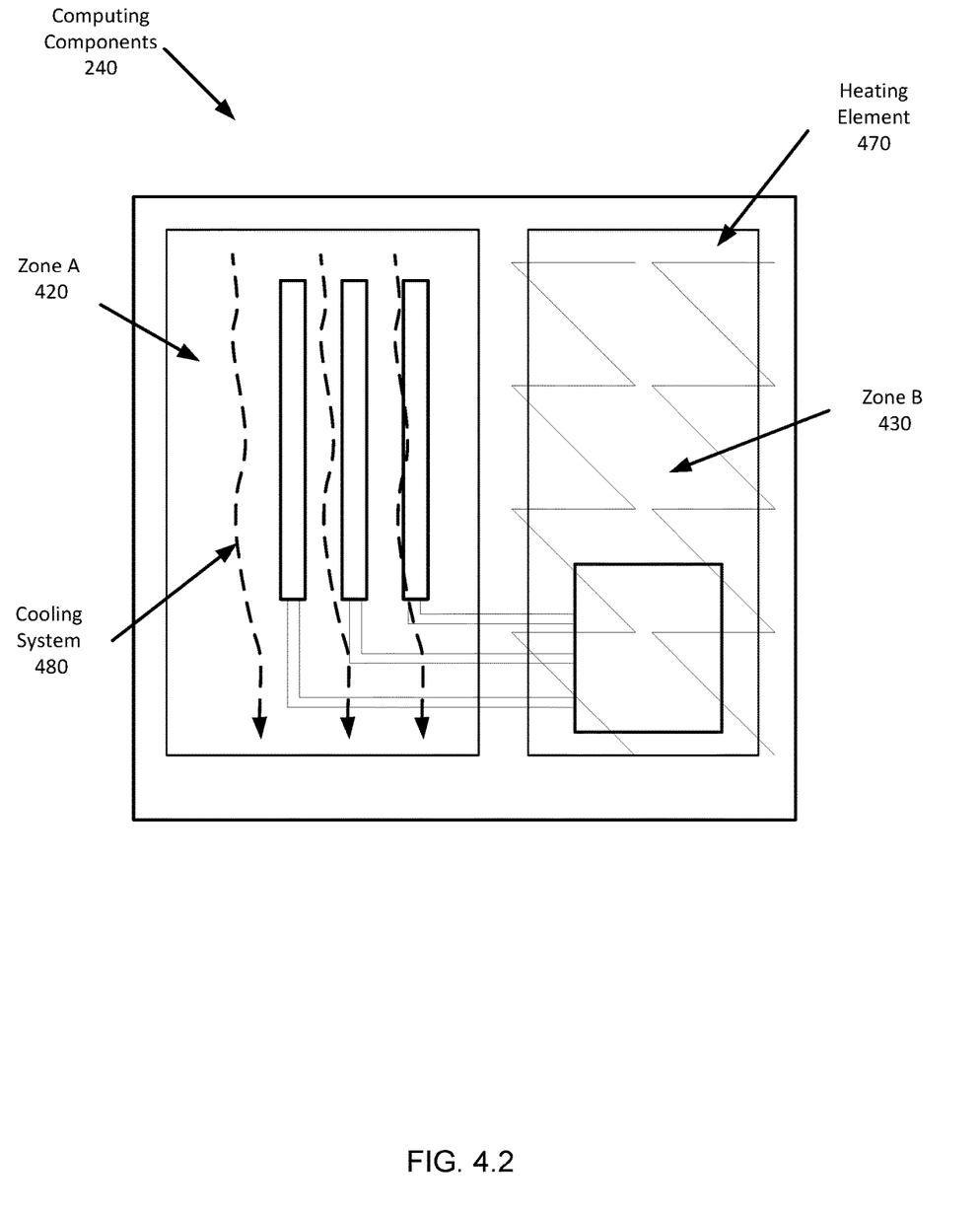

In at least one embodiment the heating element (280) can take the form of a heating device mounting over or under the surface of the computing components (240), such as a heater pad which has multiple individual heating elements. Each of the individual heating elements of the heater pad can be individually activated to selectively heat specific components/zones. Alternatively, all of the heating elements can be activated simultaneously. The heating element (280) may cover all of the computing components (240) or a select few of the computing components (240) that are more sensitive to cold. This will be described with more detail with regards to FIGS. 4.1 and 4.2.

In one embodiment, the heating element (280) is designed to heat the computing components (240) and/or other components of the chassis (120A) when based on at least the ambient temperature, the internal temperature is below a threshold. The internal temperature can optionally be determined by an internal temperature sensor (230). The temperature sensor (230) may take a variety of forms such as a thermocouple or other varieties of thermometers.

While shown as a single device in FIG. 2, the optional temperature sensor (230) can comprise of multiple temperature sensors that are mounted throughout the internal environment (210). In at least one embodiment, multiple temperature sensors (230) can be mounted with computing components (240) to give individual readings of the temperature with regards to certain components of the computing components (240).

A chassis environmental manager (220) can be provided which analysis the internal temperature of the internal environment (210) and/or ambient temperatures. In at least some embodiments, the chassis environmental manager (220) performs the methods described in more detail with regards to FIGS. 5 and 6. The chassis environmental manager (220) may control the cooling components (250), heating elements (280) and may also control the power delivered to individual computing components (240) in order to ensure a safe powering-up.

The chassis environmental manager (220) may be implemented using, for example, a digital signal processor, a field programmable gate array, or an application specific integrated circuit. The chassis environmental manager (220) may comprise of a processor and memory that can operate outside of the range of temperatures that other computing components (240) can safely operate. The chassis environmental manager (220) may be implemented using other types of hardware devices without departing from the invention.

In one or more embodiments of the invention, the chassis environmental manager (220) is implemented using computing code stored on a persistent storage that when executed by a processor that performs all, or a portion, of the functionality of the chassis environmental manager (220). The processor may be a hardware processor including circuitry such as, for example, a central processing unit or a microcontroller. The processor may be other types of hardware devices for processing digital information without departing from the invention.

The chassis environmental manager (220) and/or computing components (240) may include one or more data structures that include information regarding the environmental conditions within the internal environment (210) of the chassis (120A). For example, when temperature data is read from the ambient temperature sensor (180), the read information may be stored in an environmental condition repository. Consequently, a historical record of the ambient environmental conditions may be maintained in the repository. The historical record of the environmental conditions may include any type and quantity of information regarding the environmental conditions within and outside the chassis (120A) and/or information handling system (100). For example, an environmental condition repository may include temperature sensor data from discrete temperature sensors and/or temperature sensors integrated into computing components (and/or other types of devices).

In at least some embodiments, the environmental condition repository or any equivalent repository, may include a table of the amount of time a specific coldest component needs to be heated for a given ambient temperature. The tables may include initial factory installed relationships between ambient temperatures and a coldest component. Alternatively, the tables can be generated over time by an environmental manager (either 220 or 130).

While the data structures stored in storage have been described as including a limited amount of specific information, any of the data structures stored in storage may include additional, less, and/or different information without departing from the embodiments disclosed herein. Further, the aforementioned data structures may be combined, subdivided into any number of data structures, may be stored in other locations (e.g., in a storage hosted by another device), and/or spanned across any number of devices without departing from the embodiments disclosed herein. Any of these data structures may be implemented using, for example, lists, tables, linked lists, databases, or any other type of data structures usable for storage of the aforementioned information.

Alternatively, or in addition to, the chassis environmental manager (220) can be part of other components mounted in the chassis (120A), such as the cooling components (250), heating element (280) or computing components (240). The chassis environmental manager as well as other environmental control components can also include or comprise of components (not shown) that are not disposed in the chassis (120A). For example, the environmental control components may include an airflow conditioner. These external components may be used in conjunction with the environment control components disposed within the chassis to manage the temperature and/or relative humidity levels throughout the internal environment (220) of the chassis (120A).

The chassis (120A) may include any number and type of environmental control components without departing from the invention. Any of the environmental control components may be implemented using physical devices operably connected to and/or controllable by the chassis environmental manager (220) and/or a system environmental managers (130) that is part of the larger information handling system (alone or in combination). Any number of chassis environmental managers (220) and system environmental managers (130) may cooperatively operate to control the temperature and/or relative humidity levels of the internal environments of any number of chassis to control the rate of corrosion occurring within the chassis and/or manage the thermal load generated by the computing components (240) and/or other components.

The cooling components (250), heating element (280), and other environmental control components may be physical devices that are able to, at a granular level, modify characteristics of the ambient environment of a set of one or more computing components (240) without affecting the ambient environment of other computing components (240) outside of the set. The environmental control components (250) may be modified in response to a change in ambient environment to enable, or disable, airflow to pass through the set of computing components associated with a specific airflow component. The airflow may be an airflow provided by an airflow component (e.g., a fan forming part of the environmental control components 250) in the chassis (120A). In enabling, or disabling, the airflow, the temperature of the environment of the set of computing components (240) may be increased or decreased, which may result in a reduction in the rate of change of contamination on the set of computing components while maintaining the nominal range of temperatures that is preferred for operability in the set of computing components.

While the chassis environmental manager (220), cooling components (250) and heating elements (280) of FIG. 2 have been described and illustrated as including a limited number of specific components for the sake of brevity, these components in accordance with embodiments of the invention may include additional, fewer, and/or different components than those illustrated in FIG. 2 without departing from the invention.

While the chassis (120A) has also been illustrated as including a limited number of specific components, a chassis in accordance with one or more embodiments of the invention may include additional, fewer, and/or different components without departing from the invention. Additionally, while the chassis (120A) is illustrated as having a specific form factor (e.g., rack mount), a chassis in accordance with embodiments of the invention may have different form factors without departing from the invention including as a device that can operate by itself with or without a frame (110).

As discussed above, the chassis (120A) may house computing components (not shown). The computing components may enable computing devices to provide services, as discussed above. The computing components may include, for example, packaged integrated circuits (e.g., chips). The computing components may enable any number and type of functionalities to be performed by a computing device.

In one or more embodiments disclosed herein, the computing components in the chassis (120A) include storage that is implemented using devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, the computing components in the chassis (120A) may include a memory device (e.g., a dual in line memory device) in which data is stored and from which copies of previously stored data are provided. In another example, the computing components may include a persistent storage device (e.g., a solid state disk drive) in which data is stored and from which copies of previously stored data are provided. In another example, computing components may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data and cause the memory device to lose the data).

Computing components may consume electrical power and generate heat as a byproduct of performing their functionality. Further, the computing components may have some sensitivity to temperature. For example, the computing components may only operate nominally (e.g., as designed) when the temperatures of the respective components are maintained within a preferred temperature range. Consequently, all, or a portion, of the computing components may require some level of cooling and/or heating to continue to operate nominally.

Because the information handling system (100) uses computing components to provide services, the ability of the information handling system (100) to provide services is limited based on the number and/or quantity of computing devices that may be disposed within the chassis. For example, by adding additional processors, memory modules, and/or special purpose hardware devices, the computing device may be provided with additional computing resources which may be used to provide services. Consequently, large number of computing components that each, respectively, generate heat may be disposed within the chassis.

Figure 3:
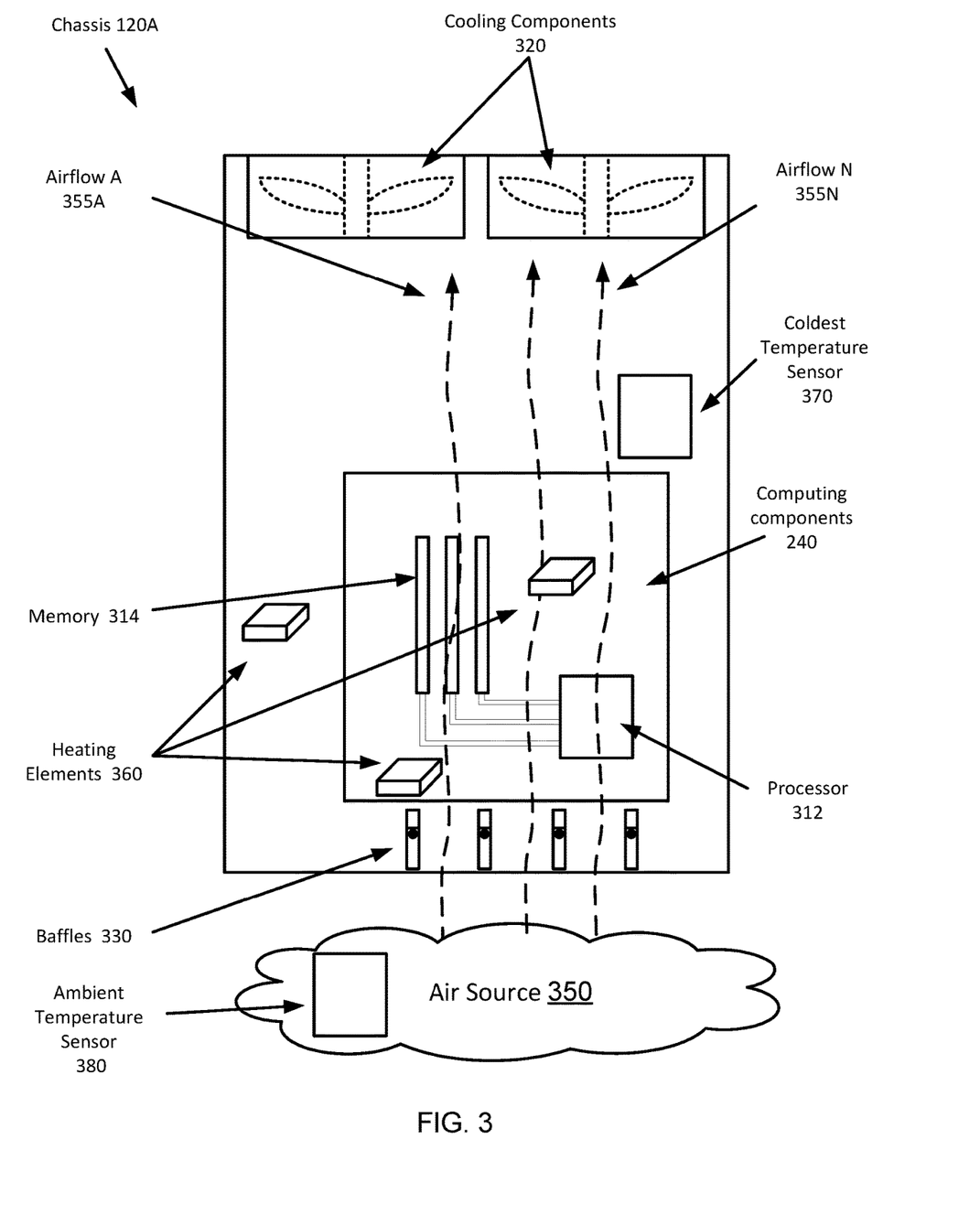
FIG. 3 shows a diagram of a chassis that includes heating and cooling components in accordance with one or more embodiments of the invention.

To further clarify embodiments of the invention, a non-limiting example is provided in FIG. 3 of a chassis (120A) which utilizes baffles, to at least in part, control heating and cooling of the components mounted in the chassis (120A). FIG. 3 illustrates a top view diagrams of a chassis (120A) of an information handling system (100) with baffles (330). For the sake of brevity, only a limited number of components of the system of FIGS. 1.1 and 1.2 as well as the chassis of FIG. 2 are illustrated in FIG. 3.

FIG. 3 illustrates a chassis (120A) of an information handling system that houses a set of computing components (240). The computing components (240) may include, for example, a processor (312) and memory modules (314). The computing components (240) may be mounted on a circuit card, heat sink, or other structure that provides support, traces/wiring, and power to the processor, memory modules, and any other components.

To provide their functionalities, the processor (312) and the memory modules (314) may each consume electricity and produce heat as a byproduct during operation. Consequently, if left unchecked, the heat produced by these components may increase the temperatures of these components outside of their nominal operating ranges. Alternatively, if the temperature becomes too low, such as during a power loss, the components may not function correctly or incur damage due to operating outside of a nominal operating range.

To manage the temperatures of these components, the chassis (120A) may include cooling components (320). The cooling components in one non-limiting example can comprise of fans. Other types of air movers or cooling systems (including liquid cooling and Peltier cooling) are conceived of and can be used instead of or in addition to the fans.

The cooling components (320) may be fans with an adjustable rotation rate that enables them to produce airflows (e.g., 355A-355N) of variable-rate. In addition, various sets of baffles (330) can be provided to adjust the direction and flow rate of the airflows (e.g., 355A-355N). While only one set of baffles are shown, more or less sets of baffles can be used.

The operation of the cooling components (320) and baffles (330) may be controlled by an environmental manager such as that shown in FIG. 1.2 (e.g. 130) or a shown in FIG. 2 (e.g. 220). Alternatively, the cooling components (320) and baffles (330) can be controlled by controllers/processor that are part of each device. Further the environmental manager may be implemented using, for example, a digital signal processor, a field programmable gate array, or an application specific integrated circuit. The environmental manager may comprise of a processor and memory that can operate outside of the range of temperatures that other computing components (240) can safely operate. The chassis environmental manager may be implemented using other types of hardware devices without departing from the invention.

In one or more embodiments of the invention, the environmental manager is implemented using computing code stored on a persistent storage that when executed by a processor performs all, or a portion, of the functionality of the environmental manager. The processor may be a hardware processor including circuitry such as, for example, a central processing unit or a microcontroller. The processor may be other types of hardware devices for processing digital information without departing from the invention.

The environmental manager receives ambient temperature data from an external ambient temperature sensor (380) which is in the vicinity of the air source (350) used to cool the components of the chassis (120A). The environmental manager can also receive temperature data from a coldest temperature sensor (370). More or less temperature sensors can be used depending on specific needs to allow the environmental manager to understand the environmental conditions within the chassis (120A). Other types of sensors such as air speed sensors (not shown) may be included as needed.

As shown in FIG. 3, the environmental manager, causes cooling components (320) to produce airflows (355A-355N). The cooling components draw in air from an air source (350) through front baffles (330) and expels the airflow 355 out of the chassis. The air source (350) can comprise of ambient air from outside the information handling system (100) that is drawn in through the air intake (140) and air exchanges (170). Alternatively, the air source (350) can be cooling/heating air provided by an HVAC system of the facility the information handling system is mounted within. Other sources of the air besides these just listed could also be used.

The airflow (355) can be visualized as a series of airflow (355A-355N) which cool (or heat) sub portions of the chassis (120A) and devices within. In reality the various air masses making up the airflows (355) mix and diffuse into each other and the individual series of airflows (355A-355N) are only shown to increase understanding of the heating and cooling of the chassis (120A).

For example airflow A (355A), indicates an air mass that traverses proximate to the memory modules (314), reduces the temperature of the memory modules to a nominal range. Another airflow (314N), indicates an air mass that traverses proximate to the processor (312) and reduces the temperature of the processor to another nominal range.

A first front baffle (330A) may be positioned to control the airflow proximate to the memory modules (314), while additional front baffles (330) control the airflow proximate other components. By separately operating the baffles and cooling components, separate zones of heating and cooling can be established within the chassis (120A).

Various combinations of open and closed baffles (330) as well as operations of the cooling components can be configured as appropriate by the environmental manager. The method of controlling the baffles and cooling components (320) to heat or cool individual zones or areas of the chassis (120A) is described in more detail in FIGS. 4.1 and 4.2 Alternatively, additional cooling and heating means can be used alongside the baffles to heat and cool individual zones.

The chassis (120A) of FIG. 3 includes multiple heating elements 360. The heating elements (360) can be placed in multiple locations in the chassis (120A) and can be associated with specific zones and/or components. This would allow for target heating or cooling of specific zones or components that have different heating needs than other zones or components.

To further clarify embodiments of the invention, a non-limiting example of the heating and cooling zones, is provided in FIGS. 4.1 and 4.2. FIGS. 4.1 and 4.2 illustrate top view diagrams of the computing components (240) separated into at least two zones: zone A (420) and zone B (430). For the sake of brevity, only a limited number of components of the system of FIG. 2 are illustrated in each of FIGS. 4.1 and 4.2.

FIG. 4.1 shows the computing components (240) of an electronic device such as the chassis (120A) of the information handling system (100). The computing components (240) can include heat generating components such as a processor (460) and memory (450) which are connected to each other. Other components as needed can be included in the computing components (240) as well, such as traces, other processors, and other storage means. The components can be mounted on one or more cards, printed circuit boards (PCBs) or other structures such as heat sinks (not shown).

The computing components can be divided into separate heating zones. FIG. 4.1 shows a non-limiting example where there are two zones (420 and 430), however more zones can be used. Alternatively, the computing components (240) can reside in only one zone, while other components of the chassis (120A) can be considered one or more different zones. The zones (420 and 430) are chosen so that different components, which have different heating and cooling needs, can be separately heated or cooled as shown in more detail in FIG. 4.2.

Either zone (420 or 430) can be heated based on the predetermined time specified for a given ambient temperature and components within the specific zone. If the system is restarted or allowed to cool to ambient temperatures, upon restarting the system, the zone (420) can be heated for a specified period of time. This can be repeated for each zone and as shown in FIG. 4. It is possible that one zone (420) can be cooled while an additional zone (430) is heated. Other combinations and number of zones are possible and anticipated by this invention.

FIG. 4.2 shows a non-limiting Example where the first zone, zone A (420) is cooled in at least one embodiment by a cooling system (480). The second zone B (430) is heated by a heating element (470) while the first zone A (420) is being cooled.

While FIG. 4.2 shows the first zone A (420) being cooled by cooling Air (480), alternatively, or additionally it could be cooled by a cooling element that is specific to that zone and could comprise such devices as thermoelectric coolers, a Peltier cooler, liquid cooler, or other cooling means that can be zone specific. In yet another alternative it could be selectively cooled by selectively using baffles and cooling components as described with regards to FIG. 3 and by the method described in FIGS. 5 and 6.

Similarly FIG. 4.2 shows a non-limiting example where zone B (430) is being heated. As shown in FIG. 4.2 the zone is heated using a heating element (470). Heating element could take many forms, including resistive heating built into the substrate that the processor and other components are mounted on. Other heating means could be a thermal blanket, a heater pad with individual heating elements, heated liquid, or other heating means that can be zone specific. In yet another alternative it could be selectively heated by the selective use of baffles as described with regards to FIG. 3 and by the method described in FIGS. 5 and 6.

While the electronic device such as the information handling system (100) and chassis (120A) has been illustrated in FIGS. 1.1, 1.2, 2, 3, 4.1, and 4.2 to include specific numbers and types of components, an electronic device in accordance with embodiments of the invention may include different, fewer, and/or additional components without departing from the invention.

Figure 5:
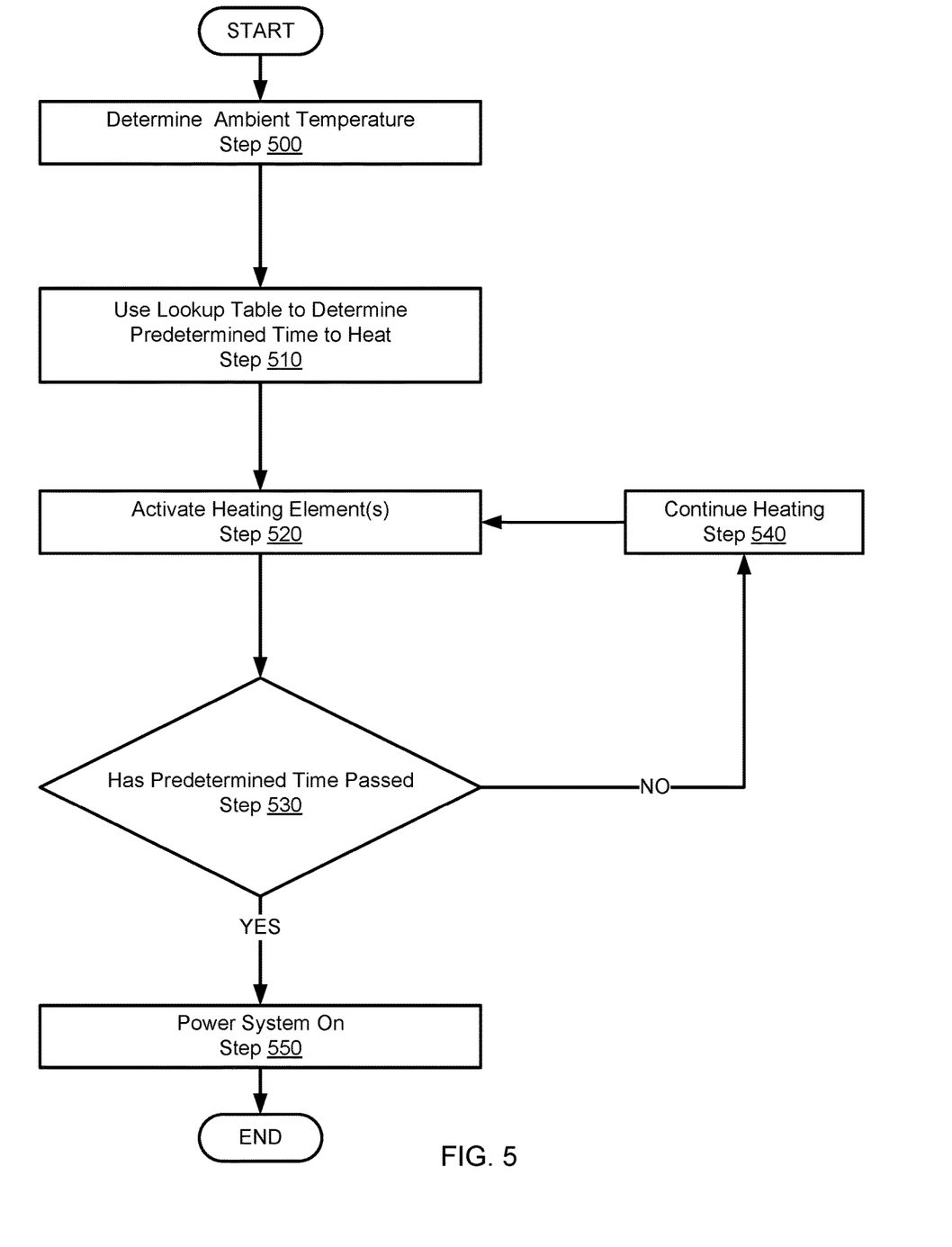
FIG. 5 shows a flowchart of a method of heating the system based on the time to heat the coldest component of the system in accordance with one or more embodiments of the invention.
Figure 6:
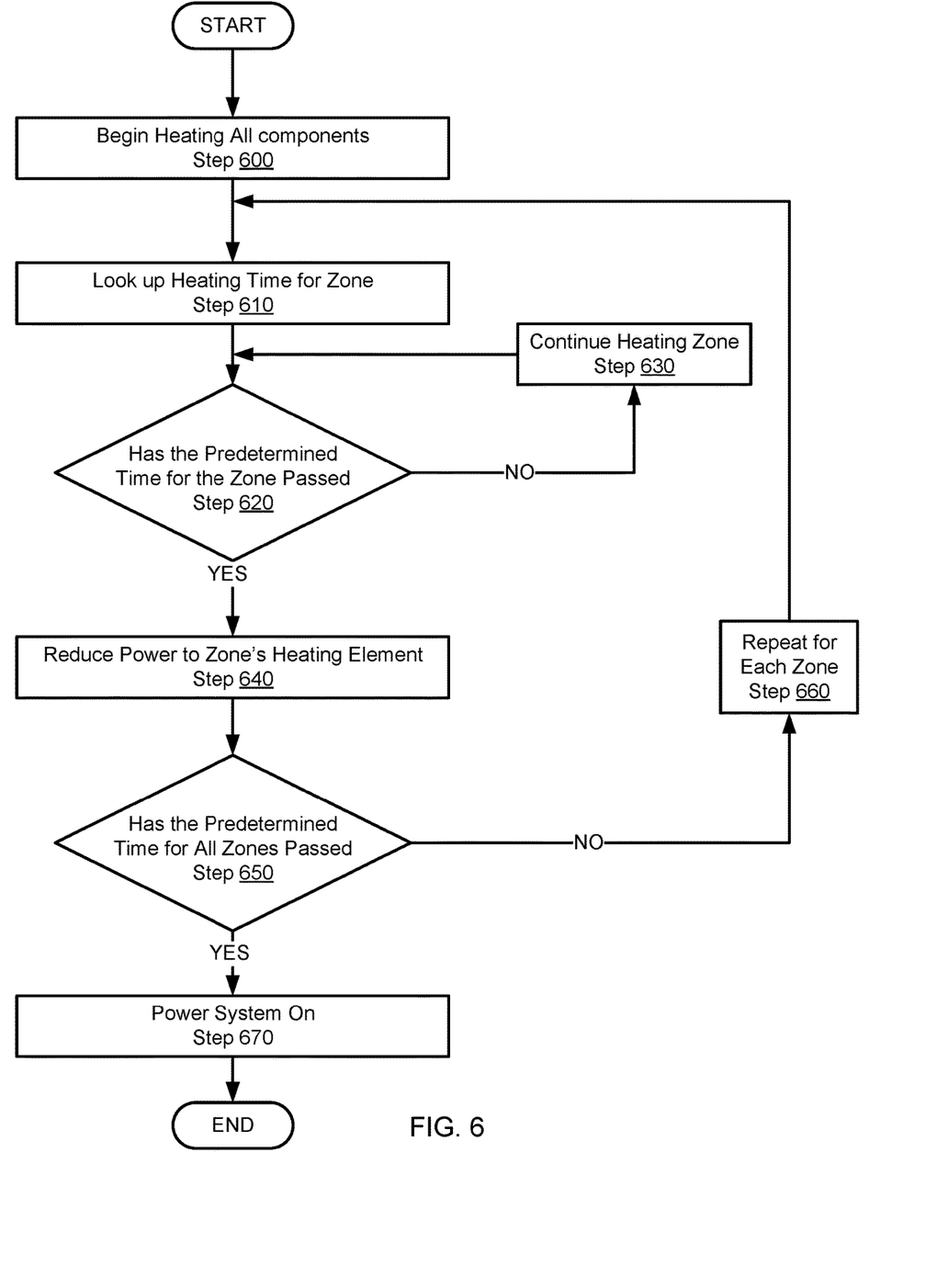
FIG. 6 shows a flowchart of a method of heating each zone based on a predetermined time in accordance with one or more embodiments of the invention.

FIGS. 5 and 6 show flowcharts of methods in accordance with one or more embodiments of the invention.

The method depicted in FIG. 5 may be used to heat and electronic device for a predetermined time based on a determined ambient temperature. The method utilizes a lookup table or similar source for determining the predetermined time. The method shown in FIG. 5 may be performed by, for example, by the chassis environmental manager (e.g., 220, FIG. 2). Alternatively, this can be performed by the device's BIOS. Other components of the system illustrated in FIGS. 1.1, 1.2, 2, 3, 4.1, and 4.2. may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, the system determines the ambient temperature. This can be done with an ambient temperature sensor (e.g. 180 or 380) which determines the temperature in the vicinity of the information handling system or other similar electronic device such as a personal computer, laptop, smart phone, television, or other device that this method would be useful for. The ambient temperature sensor (180 or 380) is provided to determine the temperature of the air source (350) surrounding the electronic device and can be an accurate indicator of the internal temperature of the device, at least after it has been powered down for a significant period of time. Alternatively, or additionally a temperature sensor (230) can be used to determine the internal temperature and be used to increase or decrease the predetermined time when the internal temperature is different then the ambient temperature.

The ambient temperature sensor (180 or 380) can take a variety of forms such as a thermocouple or a thermometer. The ambient temperature sensor (180) can be mounted as shown in FIG. 1.2 on a door (150) of an information handling system (100). Alternatively, the ambient temperature sensor (180 or 380) can be mounted outside of the facility housing the information handling system (100). Alternatively, the ambient temperature sensor (180 or 380) can be part of the environmental manager (130 or 220) or any other device in the information handling system (100), which can receive ambient temperature data for an external source, such as an online weather/forecasting service.

While a single ambient temperature sensor (180) is shown in FIG. 1.2, a plurality of ambient temperature sensors can be provided and they can be mounted in different locations in the vicinity of the information handling system (100). The ambient temperature can also be the lowest temperature detected over a specific period or may be a historical lowest temperature for a particular location stored in the memory of the electronic device.

In step 510, a processor uses a lookup table to determine the predetermined time to heat the electronic device based on the determined ambient temperature from step 500. In at least one embodiment of the invention, the lookup table comprises of times that are needed to heat a coldest component in the device or a specified zone, from a measured ambient temperature until the coldest component should be at an operational temperature.

The coldest component, is a component of the electronic device or zone within the electronic device that has been determined by the manufacture to take the longest to heat from a specific ambient temperature to a minimal operational temperature. For example if it is determined by the manufacture, that memory (314) take longer than processor (312) to reach an operational temperature, then the table would provide times to heat the memory to the operational temperature. Alternatively, the memory (314) and processor (312) could be in separate zones and the each may be the coldest component for its respective zone.

While in at least one embodiment the predetermined times are stored in a lookup table, other means of storing the data can be used including, for example, a graph or a real time calculation based on past performance. The table or other means provides a correspondence between an ambient temperature of the air source (350) and time to heat a zone or the device. For example (in a non-limiting example), if the ambient temperature is −10° C. the table might provide a heating time of 20 minutes, which will allow the device to reach 20° C. safely.

The specific time for the table can be determined by the manufacturer. The manufacturer can provide a variety of temperature sensors in a test device, and record how long specific components take to heat from various ambient temperatures. Using this data the lookup table or other means of storing the data can be produced. The table only needs to provide the data for the coldest component in a zone or device, as it can be presumed that all other devices will have reached a safe operating temperature within the predetermined time as well. Other means of producing the data in the lookup table can be used, including having the data determined with an internal coldest temperature sensor (370) after deployment in the field.

Once the predetermined time to heat is determined in step 510, the heating element(s) are activated in step 520. This can comprise of activating individual heaters throughout the device or one heater. The heating elements of at least some embodiments is described in more detail with regards to FIGS. 3 and 4.2. Alternatively, this could involve switching to a heated source of air provided by the facility. Other heating means can be also used.

In step 530 it is determined if the predetermined time has passed. If the predetermined time has not passed the method continues to heat the device or zone in step 540. If the predetermined time has passed, then the system is powered on in step 550. Other combinations and procedures for powering on the system can be used, based on the specific device, use, and user/manufacture's preferences.

The method of FIG. 5 may end following steps 550.

The method depicted in FIG. 6 depicts a method similar to that of FIG. 5. The method of FIG. 6 heats a plurality of zones (as depicted in FIG. 4.1 for example) for zone specific predetermined times. The method shown in FIG. 6 may be performed by, for example, the chassis environmental manager (e.g., 220, FIG. 2). Alternatively, this can be performed by the device's BIOS. Other components of the system illustrated in FIGS. 1.1, 1.2, 2, 4.1, and 4.2. may perform all, or a portion, of the method of FIG. 6 without departing from the invention.

While FIG. 6 is illustrated as a series of steps, any of the steps may be omitted, performed in a different order, additional steps may be included, and/or any or all of the steps may be performed in a parallel and/or partially overlapping manner without departing from the invention.

In step 600, the system begins heating all the components/zones. This is done, for example, after the device is powered on after being powered off for a period of time sufficient to render the device at ambient temperatures. Alternatively, this can be done when a new device is installed (such as a new chassis (120A) being installed in the information handling system (100) zone (420).

In step 610, the system looks up a heating time for a specific zone (420 and 430). Each zone is treated separately in the method of FIG. 6 and each zone has its own heating time based on the specific components in the heating zone. As discussed in more detail with the method of FIG. 5, the heating time is determined based on at least in part, the ambient temperature determined by an ambient temperature sensor (180 or 350). Alternatively, or additionally an initial internal temperature reading for the entire device or chassis (120A) can be used.

In step 620, the system determines if the predetermined heating time for the zone has passed. If the time has not passed, the system continues heating the zone in step 630 until the predetermined time has passed. Once the predetermined time has passed the method proceeds to step 640.

In step 640, the system reduces the power to the zone's heating element. This can include powering off the heating element if the ambient temperature or internal temperature is measured to be at a high enough temperature that the zone will remain at an operational/nominal temperature. In another embodiment the method of step 640 can comprise of powering the heating element at a reduced temperature significant enough to maintain the zone at an operational/nominal temperature.

In step 650, the method determines if all zones of the device have been heated for their specific predetermined amount of time. If they have not in step 660, the method proceeds to repeat steps 610-640 for each zone. Once the predetermined time of all zones has passed, then the system can safely power on in step 670. Alternatively, step 670 can be performed for individual components in each zone prior to step 650, so that only those components in a zone that is at an operational/nominal temperature are powered on, as each zone reaches the operational/nominal temperature. Other combinations and methods of powering on the system can be used.

The method of FIG. 6 may end following steps 670.

Figure 7:
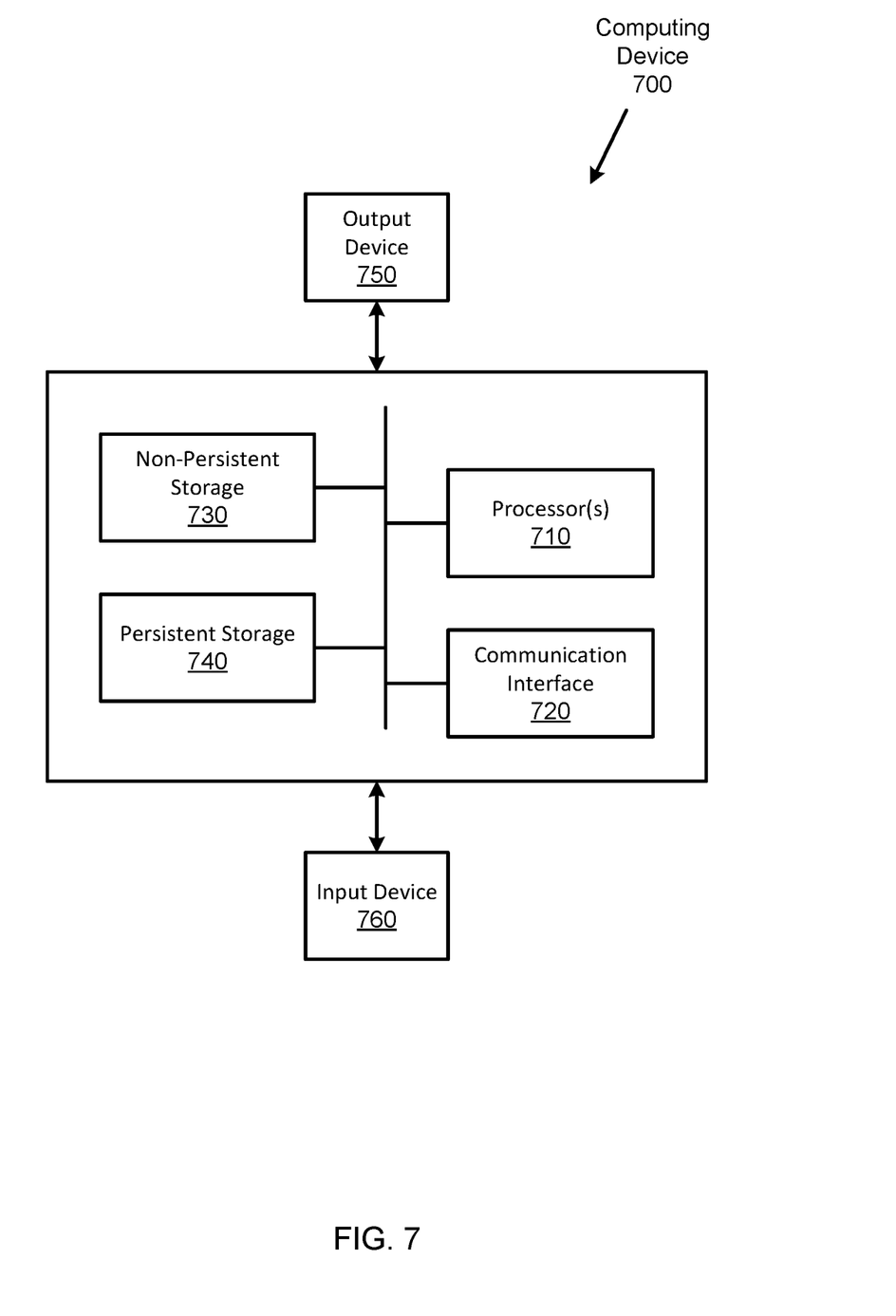
FIG. 7 shows a diagram of a computing device in accordance with one or more embodiments of the invention.

Additionally, as discussed above, embodiments of the invention may be implemented using a computing device. FIG. 7 shows a diagram of a computing device in accordance with one or more embodiments of the invention. The computing device (700) may include one or more computer processors (710), non-persistent storage (730) (e.g., volatile memory, such as random access memory (RAM), cache memory), persistent storage (740) (e.g., a hard disk, an optical drive such as a compact disk (CD) drive or digital versatile disk (DVD) drive, a flash memory, etc.), a communication interface (720) (e.g., Bluetooth interface, infrared interface, network interface, optical interface, etc.), input devices (760), output devices (750), and numerous other elements (not shown) and functionalities. Each of these components is described below.

In one embodiment of the invention, the computer processor(s) (710) may be an integrated circuit for processing instructions. For example, the computer processor(s) may be one or more cores or micro-cores of a processor. The computing device (700) may also include one or more input devices (760), such as a touchscreen, keyboard, mouse, microphone, touchpad, electronic pen, or any other type of input device. Further, the communication interface (720) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (750), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (710), non-persistent storage (730), and persistent storage (740). Many different types of computing devices exist, and the aforementioned input and output device(s) may take other forms.

Embodiments of the invention may provide an improved method for pre-heating an electronic device such as an information handling system (100), when internal temperatures are below safe operating ranges. To do so, the system selectively heats the entire device or select zones of the electronic device for a predetermined amount of time when the system is restarted after a period of time sufficient to bring the system to ambient temperatures. This may be done by individual heaters and/or cooling system for each separate zones. Alternatively, or in addition too, the system can selectively open and close baffles, causing fresh ambient air to enter and/or recirculate heated air in a device's enclosure. This keeps sensitive components of the computing device, such as processors and memory from suffering damage, by operating them at temperatures that are either too cold or too warm.

The predetermined amount of time is determined based on measured ambient temperatures. Using a table that corresponds the ambient temperatures to a time that a component needs to heat up to a nominal temperature in a zone, the predetermined time can be calculated.

Thus, embodiments of the invention may address the problem of heating specific components of a device which have different preferred operating range and/or heat at different rates, without the need of additional internal sensors.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for preheating an electronic device, comprising:
    measuring an ambient temperature of air outside of the electronic device;
    using a lookup table to determine a predetermined time to heat the electronic device based on at least the ambient temperature of air outside of the electronic device, wherein the lookup table is determined by measuring an amount of time to heat a specific component to a threshold internal temperature from a starting ambient temperature;
    heating the electronic device for the predetermined time; and
    powering on the electronic device when the predetermined time is completed.

2. The method of claim 1, wherein the lookup table is provided by a manufacturer of the electronic device.

3. The method of claim 1, wherein the electronic device comprises multiple heating zones.

4. The method of claim 3, wherein each heating zone is independently heated and is associated with a per zone lookup table.

5. The method of claim 3, wherein the electronic device is powered on only when all of the predetermined times for each of the zones has elapsed.

6. An electronic device comprising:
    at least one sensor for determining an ambient temperature of air outside of the electronic device;
    a processor that controls the electronic device; and
    a memory having computer program instructions stored thereon, the processor executing the computer program instructions in the memory to perform a method comprising:
        measuring by the at least one sensor an ambient temperature of air outside of the electronic device;
        using a lookup table to determine a predetermined time to heat the electronic device based on at least the ambient temperature of air outside of the electronic device, wherein the lookup table is determined by measuring an amount of time to heat a specific component to a threshold internal temperature from a starting ambient temperature;
        heating the electronic device for the predetermined time; and
        powering on the electronic device when the predetermined time is completed.

7. The electronic device of claim 6, wherein the lookup table is provided by a manufacturer of the electronic device.

8. The electronic device of claim 6, wherein the electronic device comprises of multiple heating zones.

9. The electronic device of claim 6, wherein the electronic device is a chassis mounted in an information handling system.

10. The electronic device of claim 8, wherein each heating zone is separately heated and has a per zone lookup table.

11. The electronic device of claim 8, wherein the electronic device is powered on only when all of the predetermined times for each of the zones has elapsed.

12. A non-transitory computer readable medium comprising computer readable program code, which when executed by a computer processor enables the computer processor to perform a method for operating an electronic device, the method comprising:
    measuring an ambient temperature of air outside of the electronic device;
    using a lookup table to determine a predetermined time to heat the electronic device based on at least the ambient temperature of air outside of the electronic device wherein the lookup table is determined by measuring an amount of time to heat a specific component to a threshold internal temperature from a starting ambient temperature;
    heating the electronic device for the predetermined time; and
    powering on the electronic device when the predetermined time is completed.

13. The non-transitory computer readable medium of claim 12, wherein the lookup table is provided by a manufacturer of the electronic device.

14. The non-transitory computer readable medium of claim 12, wherein the electronic device comprises multiple heating zones.

15. The non-transitory computer readable medium of claim 14, wherein each heating zone is independently heated and is associated with a per zone lookup table.

16. The non-transitory computer readable medium of claim 14, wherein the electronic device is powered on only when all of the predetermined times for each of the zones has elapsed.

17. The non-transitory computer readable medium of claim 12, wherein the electronic device is a chassis mounted in an information handling system.

* * * * *